United States Patent [19]

Espy

[11] Patent Number: 5,674,358
[45] Date of Patent: Oct. 7, 1997

[54] REPULPING WET STRENGTH PAPER AND PAPERBOARD WITH PERSULFATE AND A CARBONATE BUFFER

[75] Inventor: Herbert H. Espy, Wilmington, Del.

[73] Assignee: Hercules Incorporated, Wilmington, Del.

[21] Appl. No.: 479,489

[22] Filed: Jun. 7, 1995

Related U.S. Application Data

[63] Continuation of Ser. No. 940,142, Sep. 3, 1992, abandoned.

[51] Int. Cl.$^6$ .................... D21C 5/02; D21C 3/02
[52] U.S. Cl. ........................ 162/7; 162/8; 162/6
[58] Field of Search .................. 162/5, 6, 7, 8

[56] References Cited

U.S. PATENT DOCUMENTS

| | | | |
|---|---|---|---|
| 2,872,313 | 2/1959 | House | 92/1.4 |
| 3,361,618 | 1/1968 | McKinley | 162/8 |
| 3,425,897 | 2/1969 | Murphy, Jr. | 162/8 |
| 3,427,217 | 2/1969 | Miller | 162/6 |
| 3,645,840 | 2/1972 | Lincoln et al. | 162/78 |
| 3,766,001 | 10/1973 | Gleason et al. | 162/8 |
| 4,105,827 | 8/1978 | Brichard et al. | 428/403 |
| 4,233,171 | 11/1980 | McLaughlin et al. | 252/99 |
| 4,313,932 | 2/1982 | Watts | 424/62 |
| 4,343,679 | 8/1982 | De Ceuster et al. | 162/4 |
| 4,416,727 | 11/1983 | Elton et al. | 162/8 |
| 4,675,076 | 6/1987 | Darlington | 162/78 |

FOREIGN PATENT DOCUMENTS

| | | | |
|---|---|---|---|
| 96176 | 2/1981 | Japan . | |
| 58-70788 | 4/1983 | Japan | 162/6 |
| 59-21790 | 2/1984 | Japan | 162/6 |
| 94/20682 | 9/1994 | WIPO . | |

OTHER PUBLICATIONS

Patrick "Paper Recycling" pp. 155–156, Miller Freeman Inc, 1991.
Stephenson "Pulp and Paper Manufacture", vol. 2 pp. 151–152, 1951.
H. H. Espy, et al.: "Chlorine–Free Reagents for Repulping Alkaline–Curing Wet–Strength Broke", *TAPPI Paper Makers Conference Procedure*, pp. 147–149 Apr. 23–25, 1990.
WPI ACC No.: 81–28322D/16, Abstract, *Derwent Publications Ltd.*, London, Great Britain, published May 27, 1981.
TAPPI J. 76, No. 2: 139–142 (Feb. 1993), H. H. Espy et al. "Persulfates as Repulping Reagents for Neutral/Alkaline Wet–Strength Broke".
Paper, Rev. No. 1974: 125, 127–128, 131, 133–134, 136, H. G. Thirkettle, "Broke Handling".
Kapadia, Pankaj C., "A Non–Chlorine Repulping Aide," TAPPI Papermakers Conference Proceedings, Apr. 5–8, 1992, pp. 51–56.

*Primary Examiner*—Karen M. Hastings
*Attorney, Agent, or Firm*—Ivan G. Szanto; Roy V. Jackson; Tara J. Gray

[57] ABSTRACT

Paper and paperboard can be effectively repulped by a composition of nonchlorinated oxidizing agent (persulfates) and a buffer (carbonates) yielding a pH of 7–12. The repulping composition of the present invention is particularly useful in repulping paper containing wet strength resins.

12 Claims, No Drawings

5,674,358

REPULPING WET STRENGTH PAPER AND PAPERBOARD WITH PERSULFATE AND A CARBONATE BUFFER

This application is a continuation of application Ser. No. 07/940,142, filed Sep. 3, 1992, now abandoned.

BACKGROUND OF THE INVENTION

1. Field of the Invention

The present invention relates to repulping paper or paperboard products.

2. Description of the Prior Art

Chemicals such as fillers, thickeners, sizing agents, defoamers, retention aids and wet and dry strength resins are widely used in manufacture of paper and paperboard.

Wet-strength resins are added to paper and paperboard at the time of manufacture. Paper normally only retains 3 to 5% of its dry strength after being wetted. Wet-strength resins allow the paper to retain 10 to 50% of its dry strength when wet. This property is useful to paper and paperboard grades such as towelling, sanitary tissue, coffee filters and milk cartons.

Paper and paperboard waste materials (broke) are difficult to repulp without special chemical treatment when they contain wet-strength resins such as polyamide-epichlorohydrin resin. These resins are disclosed in U.S. Pat. No. 2,926,116 and are commercially available from Hercules Incorporated as KYMENE® wet-strength resins.

U.S. Pat. No. 2,872,313 (House & Jen, 2/1959) teaches the use of hypochlorite salts to repulp broke containing polyalkylenepolyamine-epichlorohydrin resins. U.S. Pat. No. 3,427,217 (Miller, 2/1969) teaches the use of oxidizing salts such as sodium hypochlorite, ammonium persulfate, and others to repulp wet-strength broke containing resins such as polyaminopolyamide-epichlorohydrin resins, urea-formaldehyde and melamine-formaldehyde resins, etc. Although the hypochlorite salts effectively repulp wet-strength broke, they are chlorinating agents under some conditions, and can form environmentally undesirable organochloride-containing degradation products in process effluents.

Schmalz [Tappi, vol 44, no. 4, pp. 275–280 (April, 1961)] teaches the repulping of polyamide-epichlorohydrin resin-containing broke with hypochlorite, and alternatively with strong alkali. Although the alkali method will not chlorinate organic byproducts, it is a relatively slow process.

Espy and Geist [Proceedings, TAPPI Papermakers Conference, Washington, DC, April, 1990, pp 147–149] describe the repulping of polyamide-epichlorohydrin resin-containing broke with persulfate salts, and discloses that the process is more rapid at high pH with the addition of an alkali such as sodium hydroxide. However, it has been found that during the repulping of some grades of papers, the pH can fall as far as the acid range, slowing the further course of repulping. Persulfate salts will not themselves chlorinate organic byproducts.

Japanese Patent Application 56020692 (Honshu Paper Manufacturing KK) discloses that in treating of aqueous paper pulp, inorganic or organic oxidizing agent can be added to the pulp. Preferably phosphate is also added. Amount of the oxidizing agent added is 0.01–1 (0.05–0.2) wt. % and amount of phosphate added is 0.01–1 (0.05–0.1) wt. % per dried waste pulp. The phosphates used include sodium tripolyphosphate, sodium pyrophosphate and sodium hexametaphosphate. The oxidizing agent includes hydrogen peroxide, ammonium persulphate, potassium persulphate, sodium perborate, sodium nitrite, sodium nitrate, sodium chlorate, sodium chlorite, butyl hydroperoxide, peracetic acid and perbenzoic acid.

SUMMARY OF THE INVENTION

According to the present invention there is provided a composition for repulping paper comprising water soluble non-chlorinating oxidizing agent and water soluble buffer yielding a pH of from about 7 to about 12.

A process for repulping paper composed of cellulose fibers comprises slurrying the paper in an aqueous solution of non-chlorinating oxidizing agent and buffer yielding a pH of from about 7 to about 12.

DETAILED DESCRIPTION OF THE INVENTION

It has been discovered that paper products which contain a wet-strength resin such as polyamide-epichlorohydrin resin or equivalent thereof can be repulped for recycling by addition of a non chlorinating oxidizing agent, e.g. persulfate or monopersulfate salt and a buffering salt or salts to maintain the pH between 7 and 12. It was further discovered that lower repulping times were required at a pH of about 10.

As persulfate repulping proceeds, the pH frequently falls; i.e., the medium becomes less alkaline or more acidic. Since the reaction is faster in an alkaline medium, it is desirable to maintain alkaline conditions through the process with a sufficient content of buffering salt(s).

Wet-strength resins susceptible to degradation by the persulfate-buffer combinations of this invention include polyamide-epichlorohydrin resins such as those of U.S. Pat. No. 2,926,116, U.S. Pat. No. 2,926,154, U.S. Pat. No. Reissue 26,018; polyamine-epichlorohydrin resins such as bishexamethylenetriamine-epichlorohydrin, $C_6$-diamine-epichlorohydrin resins; polyamine-epoxyalkyl organosulfonate and polyamide-epoxyalkyl organosulfonate resins such as those of U.S. Pat. No. 5,082,527.

Operable non-chlorinating oxidizing agents include organic hydroperoxides (e.g. t-butyl hydroperoxide and cumene hydroperoxide); organic peracids (e.g. peracetic acid and perbenzoic acid); hydrogen peroxide; and ammonium, alkali metal and alkaline earth metal salts of persulfuric acid and mono-persulfuric acid. For reasons of economy, effectiveness, and reduced toxicity, hydrogen peroxide, salts of persulfuric acid, and salts of monopersulfuric acid are preferred, with sodium persulfate being most preferred.

The buffers suitable for use in the present invention are water soluble ammonium salts, alkali metal salts, and alkaline earth metal salts of a dibasic and tribasic inorganic acid, optionally in combination with its conjugate acid salt, yielding a pH between about 7 and about 12 in aqueous solution. Preferred buffers yield a pH between about 8 and about 11.

Buffers with an effective pH between 7 and 12 are listed in standard laboratory handbooks, and can be readily chosen by chemists skilled in the art. Examples include carbonate or carbonate-bicarbonate (as their sodium and/or potassium salts), phosphate-monohydrogen phosphate or monohydrogen phosphate-dihydrogen phosphate (as their sodium and/ or potassium salts), boric acid-borax, or borax-sodium borate, and the like.

If buffers consisting of a combination of dibasic or tribasic acid salts and their conjugate acid salts are used, such as carbonate-bicarbonate, phosphate-monohydrogen phosphate, monohydrogen phosphate-dihydrogen phosphate, etc, they may be prepared directly from a salt of the dibasic or tribasic acid and a conjugate acid. Alternatively, they may be formed in situ by partial neutralization of the salt of the dibasic or tribasic acid with another acid, such as mineral acids like sulfuric acid, phosphoric acid, or boric acid, atmospheric carbon dioxide, or decomposition products from the repulping process. Conversely, they may also be formed in situ by partial neutralization of the conjugate acid, such as bicarbonate salt, a monohydrogen phosphate salt, borax, etc., with a strong alkali, such as an alkali metal hydroxide or an alkaline earth metal hydroxide.

Preferred buffers are carbonate and the carbonate-bicarbonate systems. Combinations of carbonate and bicarbonate may be used, as their sodium and/or potassium salts. A particularly preferred buffer is sodium carbonate, commonly known as soda ash.

The proportion of non-chlorinating oxidizing agent to buffer salt(s) may range from about 95:5 to about 10:90 by weight, and depends on conditions. In laboratory screening experiments where paper slurry concentrations are relatively dilute, e.g. about 1.0 to 1.5%, higher proportions of buffer may be used to maintain the pH of the relatively large amount of water present; that is, the ratio of oxidizing agent to buffer will be lower. In commercial equipment where higher slurry concentrations are common (from about 3% to about 15%), the proportion of oxidizing agent to buffer salts may be high. Preferably the proportion of oxidizing agent to buffer is from about 90:10 to about 35:65, and most preferably it is from about 85:15 to about 75:25.

Pulp concentrations are those used in normal commercial practice in available commercial defibering and repulping equipment, ranging from about 1% to about 20%. In industrial practice concentrations between about 3% and 15% are usually preferred. Operating temperatures range between about 50° C. and about 95° C. in vented equipment at atmospheric pressure and between 95° C. and about 120° C. in pressurized equipment. Temperatures above about 70° C. are preferred because of faster reaction.

The amount of non-chlorinating oxidant used will depend on the kind of pulp used in the paper, the kind and amount of wet-strength resin employed, and the degree of wet strength, and can be determined by experiment. Generally, it will be from about 0.5% to about 10%, preferably from about 1% to about 8% and most preferably from about 1% to about 5% based on the weight of paper to be repulped.

Ordinarily in commercial practice, the buffer will be between about 0.01% and about 0.25% based on water in the paper slurry, preferably between about 0.02% and about 0.1%. The non-chlorinating oxidizing agent will ordinarily be used in amounts between about 0.5% and about 10% based on dry weight of paper to be defibered, with the preferred range being between about 1% and about 5%. For a given grade of wet-strength paper or paperboard, the optimum amounts of oxidizing agent and buffer salt(s) can be determined by experiment, by the criteria of speed and expense.

The wet-strength paper or paperboard to be repulped, water, non-chlorinating oxidizing agent, and inorganic buffer salts may be added in any convenient order. The oxidizing agent and buffer salts can be added to the water either as separate solution or premixed in solution or as separate dry ingredients or as a dry blend. It is convenient to adjust the water pH, and to dissolve the oxidizing agent and buffer chemicals, before adding paper, in order to facilitate good dispersion.

A preferred process mode of addition, for convenience in operation, is to add a stable solution or a dry blend of oxidizing agent and buffer salt(s). Such combinations may comprise one of the oxidizing agents disclosed above and one or more inorganic buffer salts yielding an alkaline pH. Preferred examples of dry blends include sodium carbonate or a mixture of sodium carbonate or potassium carbonate and sodium bicarbonate or potassium bicarbonate, blended with sodium persulfate. Most preferred is a blend of sodium carbonate and sodium persulfate.

The time required for complete defibering of the wet-strength paper depends on the kind of pulp comprising the paper, the type and amount of wet-strength resin, the degree of wet strength attained, and aging and/or heat curing history of the paper. Defibering of paper is considered complete when the paper has disintegrated to a suspension of individual fibers in water, free of knot or bundles of fibers. Combinations of non-chlorinating oxidizing agents and alkaline buffers can also be used to aid in dispersing paper that does not contain wet-strength resin. However, many grades of paper without wet-strength resins are relatively easily dispersed in water by mechanical forces, and the preferred use of the oxidizing agents and buffers of this invention is in wet-strength grades of paper.

The invention has industrial application in the paper industry. The following procedures, preparations and examples illustrate the practice of the invention without being limiting. Unless otherwise indicated all quantities given are in parts by weight.

REPULPING PROCEDURE

Repulping tests were carried out according to TAPPI method T205 OM-88. The apparatus is a cylindrical reaction vessel 15.2 cm diameter and 19.2 cm high, with spiral baffles on the walls, and furnished with a three-bladed propeller agitator. A 20-g sample of wet-strength paper, cut into 2.5-cm square pieces, is suspended in 1.5 liters of heated water. The reagents are added, and the mixture is agitated at 2800 rpm with heating. Small samples of the slurry are withdrawn after 5, 10, 20, 30, 40, 50, and 60 minutes. The progress of repulping is judged by comparison with standard samples at different stages of dispersion. Progress is expressed on a scale of 1 to 6, where 1 signifies unattacked paper and 6, complete defibering. In the examples, times in minutes refer to reaching stage 6—complete defibering.

PREPARATIONS A–D

Wet-strength paper was made from a 50/50 blend of bleached hardwood and bleached softwood kraft pulps, refined to about 500 Canadian Standard freeness, on a Noble-Wood handsheet machine, in water containing 100 ppm calcium hardness and 50 ppm alkalinity, at pH about 7.5. To the proportioner of the machine was added 0.5% (as resin solids based on dry fiber) of a commercial polyamide-epichlorohydrin resin, known under the trade name KYMENE® 557H wet-strength resin. Handsheets were dried for about 40 sec. at about 115° C., and were aged about 2 weeks before testing.

PREPARATIONS E–J AND L–N

Wet-strength paper was made from a 70/30 blend of bleached hardwood and bleached softwood kraft pulps, refined to about 500 Canadian Standard freeness, on a continuous sheet former, in water containing 100 ppm calcium hardness and 50 ppm alkalinity, at pH about 7.5. To the machine chest of the machine was added 0.5% (as resin solids based on dry fiber) of a commercial polyamide-epichlorohydrin resin, known under the trade name KYMENE® 557H wet-strength resin. The paper was dried over a series of driers between about 83°–89° C. to between about 4% and about 5% moisture content. Paper was aged about 2 weeks before testing.

PREPARATION K

Paper in this example was made similarly to that in Preparations E–J and L–M, except that the wet-strength chemicals added to the machine chest comprised 0.35% by weight of dry fiber of KYMENE® 557H wet-strength resin and 0.15% of sodium carboxymethylcellulose (CMC) having a degree of substitution =0.7 (commercially available as Aqualon CMC-7M).

PREPARATION O

Paper in this example was made similarly to that in Preparation K, except that the wet-strength chemicals added to the machine chest comprised 0.25% by weight of dry fiber of Kymene® 557H wet-strength resin and 0.10% of sodium carboxymethylcellulose (CMC) having a degree of substitution =0.7 (commercially available as Aqualon CMC-7M).

EXAMPLE 1

Laboratory tests were run to repulp Preparations A–O. Table 1 summarizes the combination of oxidant and buffer used and the results obtained.

TABLE 1

| Prep. | Pulp, Hwd./ Swd. | Resin % | Breaking Length, km | | | Oxidant (a,b) Wt., g | Buffer (b) Salt, Wt., g | Acid Wt., g | Init. pH | Temp. °C. | Repulp Time min |
|---|---|---|---|---|---|---|---|---|---|---|---|
| | | | Dry | Wet | % W/D | | | | | | |
| A | 50/50 | K557H 0.5% | 5.49 | 1.04 | 19.0 | PMPS, 0.60 | Na$_2$CO$_3$ 3.40 | NaHCO$_3$ 3.60 | 9.8 | 71 | 10 |
| B | 50/50 | K557H 0.5% | 5.57 | 0.97 | 17.4 | SPS, 0.46 | Na$_2$HPO$_4$ 1.55 + K$_2$HPO$_4$ 1.90 | KH$_2$PO$_4$ 2.13 (c) | 7.2 | 71 | 20 |
| C | 50/50 | K557H 0.5% | 5.33 | 0.99 | 18.6 | PPS, 0.52 | Na$_2$CO$_3$ 0.86 | NaHCO$_3$ 0.91 | 9.5 | 71 | 10 |
| D | 50/50 | K557H 0.5% | 5.33 | 0.99 | 18.6 | PPS, 0.52 | Na$_2$CO$_3$ 0.86 | NaHCO$_3$ 0.91 | 9.5 | 59 | 20 |
| E | 70/30 | K557H 0.5% | 4.88 (d) | 1.01 (d) | 20.8 (e) | SPS, 0.40 | Borax 2.91 | H$_3$BO$_3$ 0.427 | ca. 9 (f) | 71 | 50 |
| F | 70/30 | K557H 0.5% | 4.88 (d) | 1.01 (d) | 20.8 (e) | SPS, 0.40 | Na$_3$PO$_4$ 0.22 | Na$_2$HPO$_4$ 2.97 | 11 | 71 | 40 |
| G | 70/30 | K557H 0.5% | 4.80 (d) | 0.89 (d) | 18.5 | SPS, 0.46 | Na$_2$CO$_3$ 3.61 | NaHCO$_3$ 0.29 | 10.5 | 71 | 20 |
| H | 70/30 | K557H 0.5% | 5.01 (d) | 0.98 (d) | 19.6 | SPS, 0.46 | Na$_2$CO$_3$ 3.61 | NaHCO$_3$ 0.29 | 10.5 | 71 | 40 |
| J | 70/30 | K557H 0.5% | 7.63 (g) | 1.32 (g) | 17.3 | APS, 0.51 | Na$_2$CO$_3$ 1.70 | NaHCO$_3$ 1.80 | 9.8 | 71 | 30 |
| K | 70/30 | K557H 0.5% | 8.16 (g) | 1.45 (g) | 17.8 | SPS, 0.46 | Na$_2$CO$_3$ 1.70 | NaHCO$_3$ 1.80 | 9.8 (j) | 71 | 30 |
| | | | | | | SPS, 0.46 | None | None | 10.0 (i) | 71 | 40 |
| | | | | | | None | Na$_2$CO$_3$ 1.70 | NaHCO$_3$ 1.80 | 9.8 (h) | 71 | Incompl. in 60 |
| L | 70/30 | K557H 0.5% | 7.63 | 1.32 | 17.3 | SPS, 0.53 | Na$_3$PO$_4$ 0.22 | Na$_2$HPO$_4$ 2.97 | 10.9 | 71 | 40 |
| | | | | | | SPS, 0.53 | None | None | 11.0 | 71 | 50 |
| M | 70/30 | K557H 0.35% + CMC 0.15% | 7.95 (g) | 1.44 (g) | 18.7 | SPS, 0.46 | Na$_2$CO$_3$ 1.70 | NaHCO$_3$ 1.80 | 9.7 | 71 | 50 |
| | | | | | | SPS, 0.46 | None | None | 10.0 (k) | 71 | Incompl. in 60 |
| N | 70/30 | K557H 0.5% | 7.59 | 1.43 | 18.9 | H$_2$O$_2$, 0.58 | NaOH, 0.057 | Na$_3$PO$_4$ 3.07 (l) | 12 | 59 | 60 |
| O | 70/30 | K557H 0.25% + CMC 0.10% | 7.84 | 1.33 | 17.0 | H$_2$O$_2$, 1.16 | NaOH, 0.057 | Na$_3$PO$_4$ 3.07 (l) | 12 | 59 | 20 |

(a) SPS = sodium persulfate; APS = ammonium persulfate; PPS = potassium persulfate; PMPS = potassium monopersulfate [as 2KHSO$_3$:KHSO$_4$:K$_2$SO$_4$]
(b) Weights of chemical per 20-g portion of paper in 1.5 L water.
(c) Composition resulting from addition of 5.10 g KH$_2$PO$_4$ + 0.87 g NaOH.
(d) Geometric means of measurements in the machine and cross directions.
(e) Papers were oven cured for 0.5 hr at 80° C. before testing.
(f) Resultant buffer composition from 3.576 g borax + 3.45 mL 1 $\underline{N}$ HCl.
(g) Tensile data are measurements in the machine direction.
(h) Final pH was 9.5.
(i) Final pH was 7.5.
(j) Final pH was 9.8.
(k) Final pH was 2.9.
(l) Resultant buffer composition from 2.25 g Na$_2$HPO$_4$ + 0.81 g NaOH.

Preparation A through J illustrate the operability of various buffers, using various samples of wet-strength paper made at different times. Preparation K through M illustrate faster repulping in the presence of buffers, in paired tests with the same batch of paper. Preparation M also shows that the oxidant-buffer combination is superior to buffer alone, as well as to oxidant alone. Preparation N and O illustrate the use of hydrogen peroxide in the presence of buffer with two different wet strength chemical combinations.

Comparison A

Using the procedure of Example 1 paper containing KYMENE® wet-strength resin was repulped in 5 minutes at 60° C. except that 3 percent by weight sodium hypochlorite was used. As a result the repulped paper contained an objectionable organic chloride content.

EXAMPLE 2

A dry blend was prepared by mixing 0.52 g potassium persulfate with 0.86 g sodium carbonate and 0.91 g sodium bicarbonate. This produced a powdered mixture which was added to 20 g shredded paper in 1.5 liter water in a high shear laboratory mixer. The paper contained a KYMENE® wet-strength resin. The repulping mixture was maintained at a temperature of 59° C. for 20 minutes. It was observed that the paper was repulped (redispersed).

EXAMPLE 3

Example 2 was repeated with a dry blend containing 0.52 g potassium persulfate, 0.86 g sodium carbonate and 0.91 g sodium bicarbonate. Using a temperature of 71° C. the paper was redispersed in 10 minutes at a pH of 9.5.

EXAMPLE 4

Example 2 was repeated except that ammonium persulfate was substituted for sodium persulfate. Satisfactory repulping was obtained.

EXAMPLE 5

Experiments can be run similar to Examples 1-4 except using sodium, potassium or ammonium persulfate as from 50 to 90% and sodium carbonate or a mixture of sodium carbonate/sodium bicarbonate as from 10 to 50% of either a concentrated solution or dry blend to be added in an amount of from 0.5 to 5.0% by weight solids based on the weight of the paper being repulped. Depending on the paper being repulped from 20 to 60 minutes high shear agitation at 60° to 80° C. will be required.

These experiments illustrate it is possible to use any of these combinations for repulping. The use of sodium persulfate and sodium carbonate would be preferred on the basis of lower cost when used as either a dry blend or in the form of a concentrated solution.

EXAMPLE 6

Experiments can be run similar to Example 4 except that sodium persulfate is used as the oxidizing agent in the dry blend. Inorganic salts suitable other than sodium carbonate and sodium carbonate sodium bicarbonate are: trisodium phosphate, borax, sodium borate, potassium carbonate, potassium bicarbonate and disodium monohydrogen phosphate. Suitable buffering activity can be obtained in the pH 8 to 11 range as long as the amount of inorganic salt(s) in the dry blend does not exceed 50% by weight along with the remainder being persulfate.

EXAMPLE 7

A dry blend was prepared with 0.60 g OXONE® (DuPont Trademark) potassium monopersulfate and 3.40 g sodium carbonate and 3.60 g sodium bicarbonate. Using the procedure of Example 1 a laboratory sample was repulped in 10 minutes at a temperature of 71° C.

EXAMPLE 8

An experiment was run similar to Example 7 except that sodium persulfate available from FMC was used in place of DuPont OXONE® potassium monopersulfate. Similar results were obtained.

EXAMPLE 9

Example 8 was scaled up to repulp a commercial size batch. Results similar to laboratory experiments were obtained.

This illustrates how effectively the invention can be put into practice once operational parameters have been established on a smaller trial scale.

What is claimed is:

1. A process for repulping paper composed of cellulose fibers wherein the cellulose fibers are bonded together by at least one wet-strength resin, said process comprising slurrying the paper in aqueous solution containing non-chlorinating oxidizing agent selected from the group consisting of ammonium salts, alkali metal salts and alkaline earth metal salts of persulfuric acid and of monopersulfuric acid; and buffer yielding a pH of from about 9 to about 11 selected from the group consisting of ammonium, alkali metal and alkaline earth metal carbonates and optionally in combination with their conjugate acid salts.

2. The process of claim 1 wherein the wet-strength resin is polyamide-epichlorohydrin resin.

3. The process of claim 1 carried out at a temperature of from about 20° to 120° C.

4. The process of claim 1 wherein the oxidizing agent is present in an amount of from about 35 to about 90% based on the weight of oxidizing agent and buffer.

5. The process of claim 3 wherein the temperature is maintained at from about 50° to about 95° C.

6. The process of claim 4 wherein the process is carried out at a temperature of from about 50° to about 95° C.

7. The process of claim 6 wherein the oxidizing agent is sodium persulfate and the oxidizing agent is present in an amount of from about 75 to about 85% based on the weight of oxidizing agent and buffer.

8. The process of claim 6 wherein the temperature is maintained at from about 60° to about 90° C.

9. The process of claim 7 wherein the temperature is maintained at from about 60° to about 90° C.

10. The process of claim 6 wherein the oxidizing agent and buffer are dissolved in water to form an aqueous solution, the paper is added to such aqueous solution forming a slurry and such slurry is subjected to agitation.

11. The process of claim 1 wherein the oxidizing agent and buffer are added as an aqueous solution.

12. The process of claim 1 wherein the wet strength resin is selected from the group consisting of polyamide-epichlorohydrin resins, polyamine-epichlorohydrin resins, polyamine-epoxyalkyl organosulfonate resins and polyamide-epoxyalkyl organosulfonate resins.

* * * * *